United States Patent [19]
Murphy

[11] Patent Number: 5,230,612
[45] Date of Patent: Jul. 27, 1993

[54] MOTOR MOUNT FOR BLOWER HOUSING

[75] Inventor: Timothy M. Murphy, Arlington, Tex.

[73] Assignee: Molded Products, Inc., Fort Worth, Tex.

[21] Appl. No.: 569,830

[22] Filed: Aug. 20, 1990

[51] Int. Cl.⁵ .................. F04B 17/00; F16M 1/04
[52] U.S. Cl. .................. 417/350; 417/423.15; 248/638
[58] Field of Search .......... 417/350, 423.15, 423.14; 248/638, 664, 672

[56] References Cited

U.S. PATENT DOCUMENTS

| | | | |
|---|---|---|---|
| 3,083,308 | 3/1991 | Baumann | 417/350 |
| 3,102,483 | 9/1963 | Nasimian | 417/350 |
| 3,120,340 | 2/1964 | Strumpell | 417/350 |
| 3,390,401 | 6/1968 | Matsuyoshi | 417/350 |
| 4,171,190 | 10/1979 | Hudson | 248/638 |
| 4,672,819 | 6/1987 | Mino | 417/423.14 |
| 4,676,473 | 6/1987 | Giles | 248/638 |

Primary Examiner—Richard A. Bertsch
Assistant Examiner—Peter Korytnyk
Attorney, Agent, or Firm—Arthur F. Zobal

[57] ABSTRACT

A blower housing is formed by two housing members each of which has a motor chamber portion located between two blower chamber portions. The open sides of the two housing members are fitted together to form a motor chamber and two blower chambers for receiving a motor and two blowers coupled to shafts of the motor extending from opposite ends thereof. The structure forming the motor chamber portion of each of the two housing members has at least one arcuate slot formed between two arcuate edges for removably receiving at least one gasket such that arcuate edges and gaskets are provided for holding the housing of the motor. The two housing members may be formed with motor chambers portions with arcuate slots and arcuate edges of different sizes to receive and hold motor housings of different sizes.

8 Claims, 5 Drawing Sheets

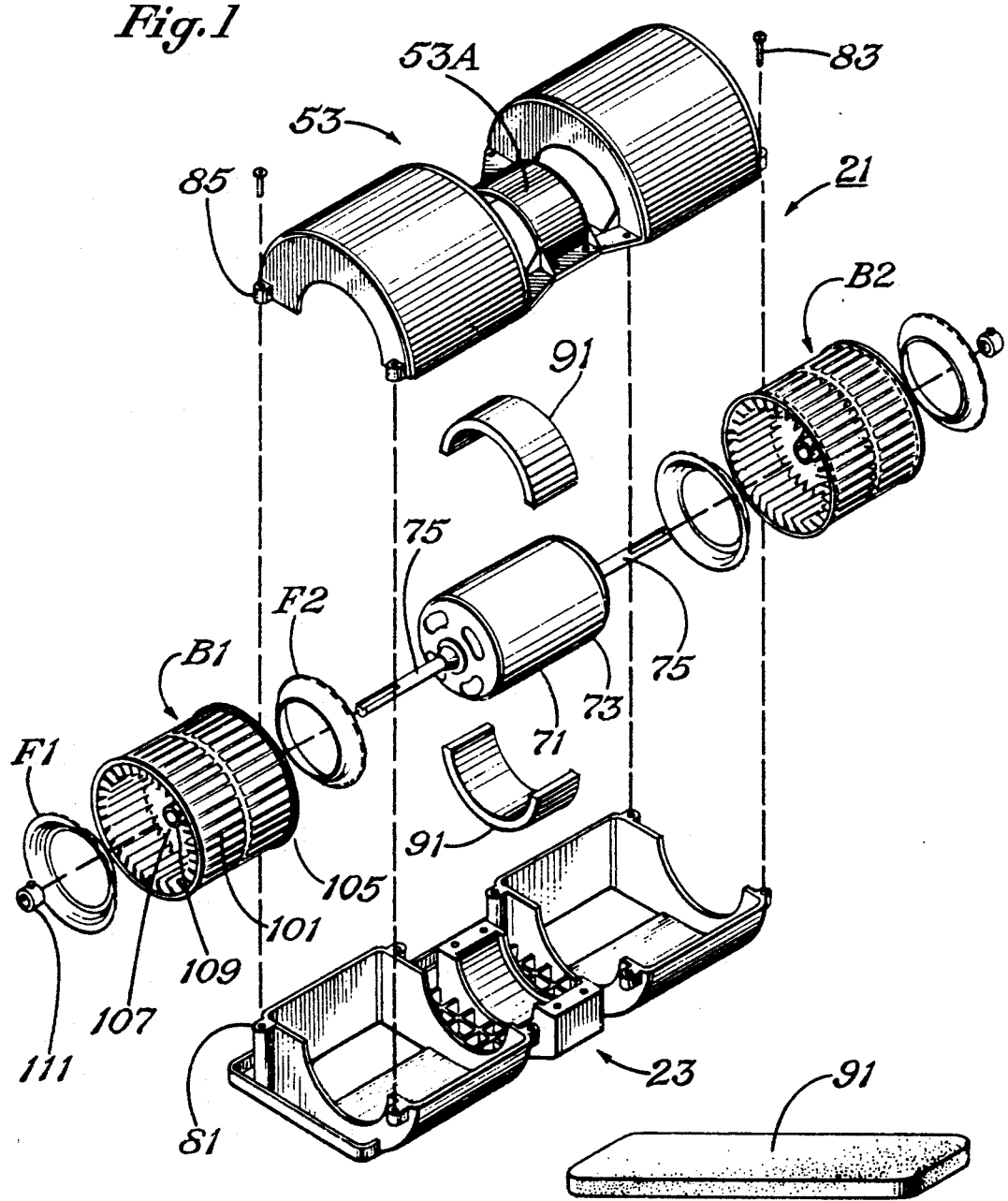

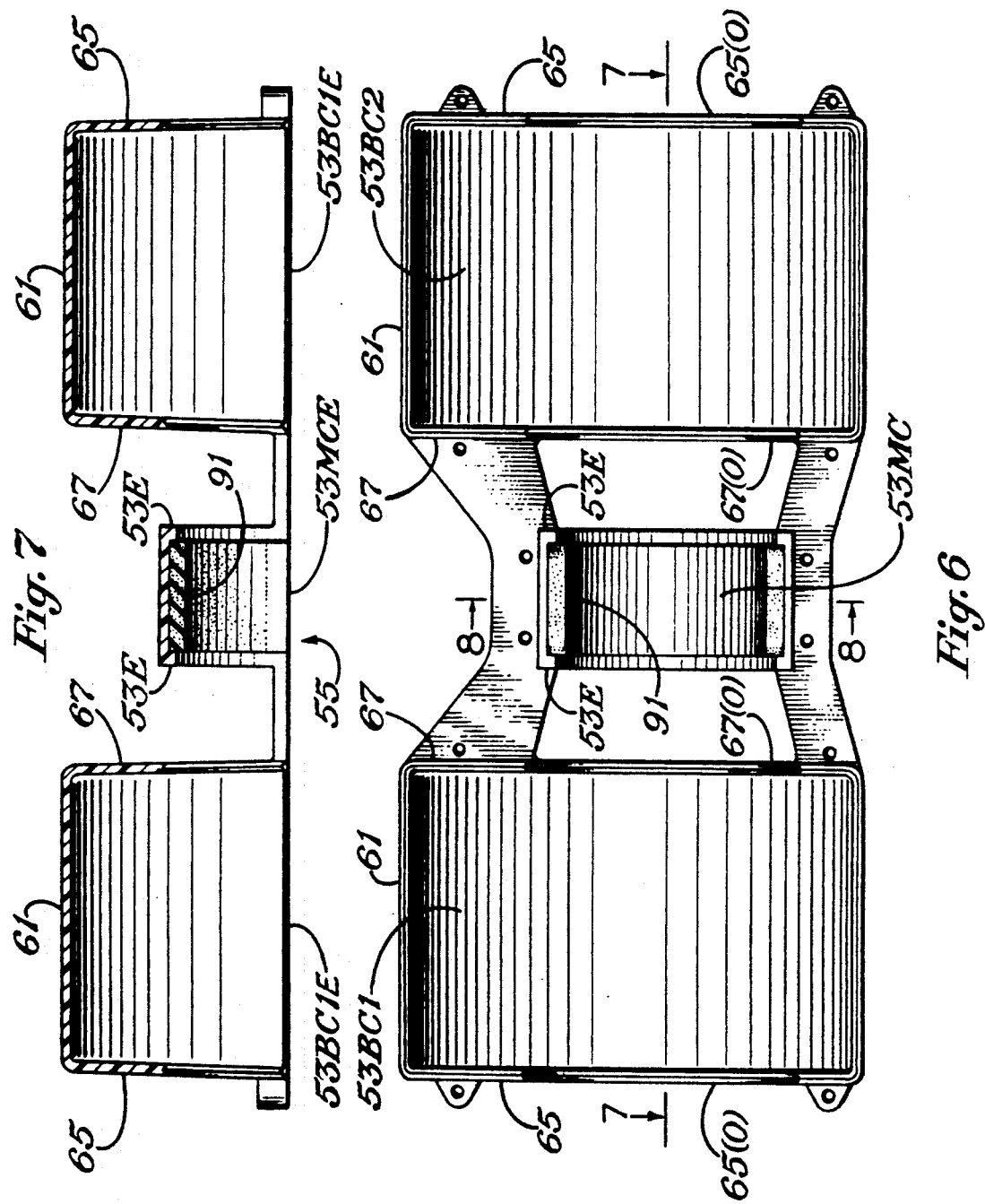

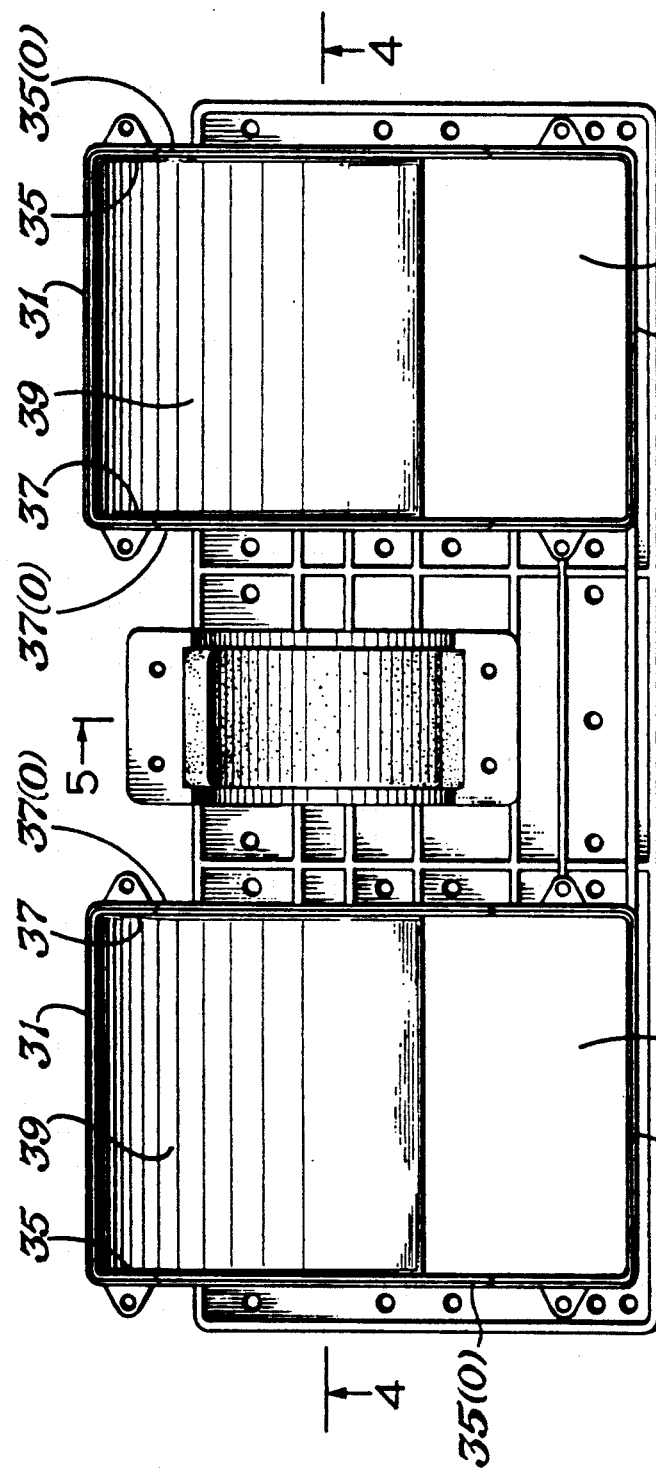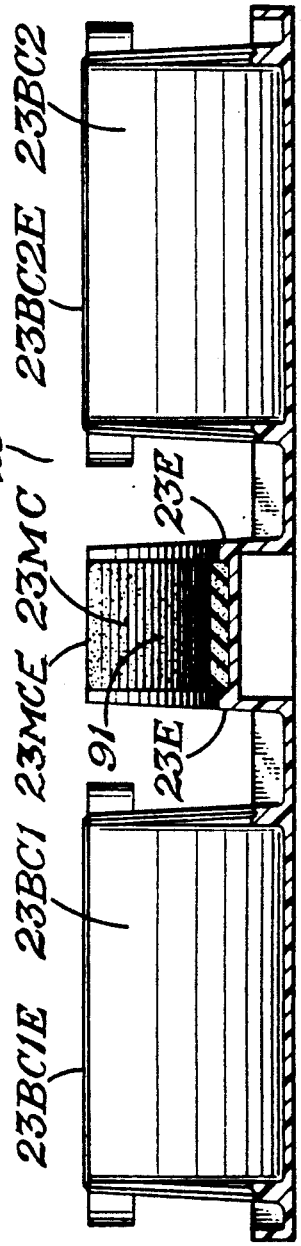

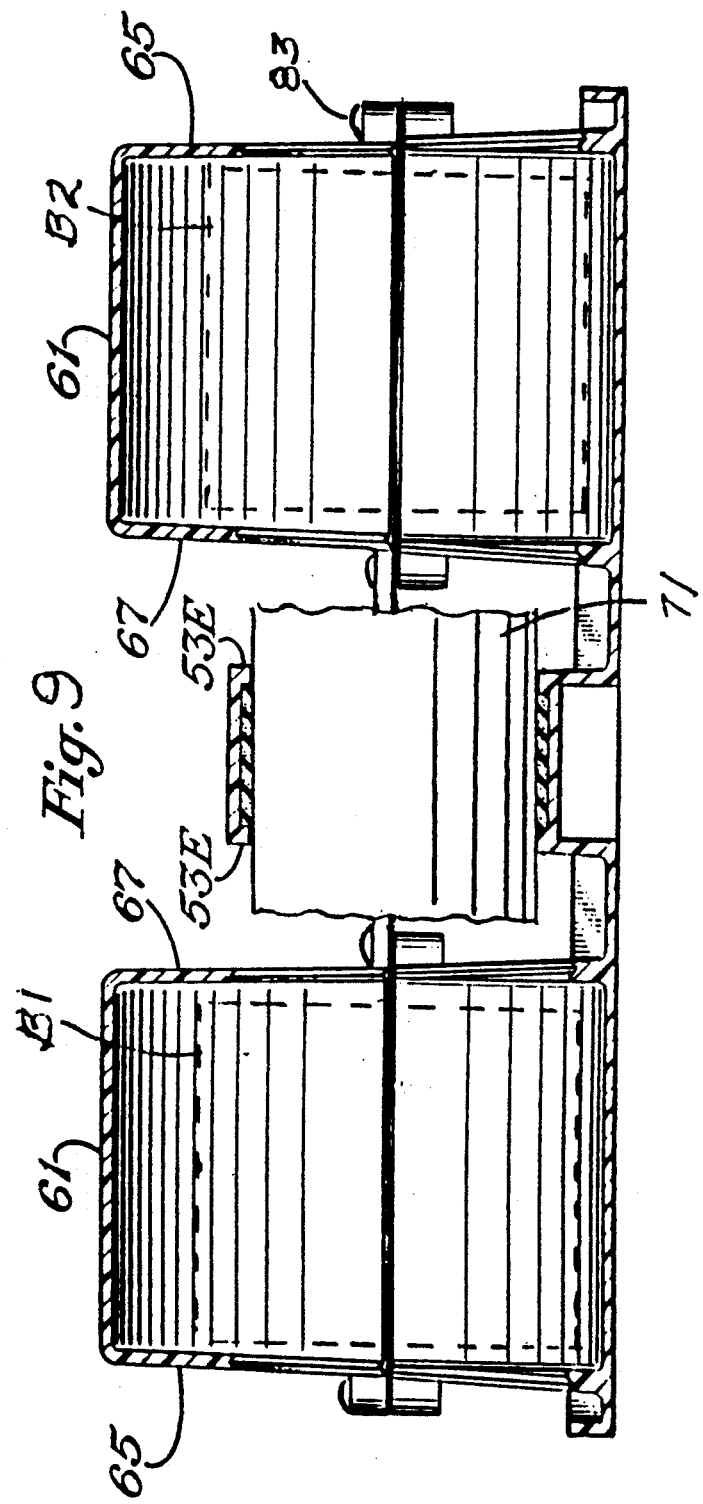

MOTOR MOUNT FOR BLOWER HOUSING

BACKGROUND OF THE INVENTION

1. Field of the Invention

The invention relates to a blower housing for dual blowers driven by an intermediately disposed motor.

2. Description of the Prior Art

U.S. Pat. No. 3,874,191 discloses a blower housing for dual blowers driven by an intermediately disposed motor for the circulation of air. Although the apparatus of this patent operates satisfactory, problems have occurred in the manner that the motor has been supported. In the past, the motor has been engaged and supported only by two gaskets which sometimes results in the motor being unbalanced or tilted and not horizontal relative to the blower housing which results in the blowers hitting the inside of the blower housing upon rotation.

SUMMARY OF THE INVENTION

It is an object of the invention to provide a blower housing for dual blowers and which can receive effectively and a hold motor and which minimizes vibration.

The blower housing is formed by two housing members each of which has a motor chamber portion located between two blower chamber portions. The two housing members each has an open side leading to the motor and blower chamber portions respectively with edges adapted to fit together to form a motor chamber for receiving and holding a motor and two blower chambers for receiving two blowers coupled to shaft means of the motor. The motor chamber portions each comprise an arcuate portion having at least one arcuate slot formed between two arcuate edges. A gasket is provided to be removably located in each of the arcuate slots of the motor chamber portions such that when the edges of the two housing members are fitted together, the housing of the motor is engaged and held by the arcuate edges and by the gaskets. The two housing members may be formed with motor chamber portions with arcuate slots and arcuate edges of different sizes to receive and hold motor housings of different sizes.

BRIEF DESCRIPTION OF THE DRAWINGS

FIG. 1 is an exploded view of the blower housing of the invention with a motor and blowers illustrated.

FIG. 2 is a view of a gasket used in the housing of FIG. 1.

FIG. 3 is a top plan view of the bottom housing member or scroll of the housing of FIG. 1.

FIG. 4 is a cross-sectional view of the housing member of FIG. 3, taken along lines 4—4 thereof.

FIG. 6 is a top plan view of the top housing member or scroll of the housing of FIG. 1.

FIG. 7 is a cross-sectional view of the housing member of FIG. 6, taken along lines 7—7 thereof.

FIG. 9 is a cross-sectional view of the two housing members fitted together and holding a motor housing. In FIG. 9 the motor is only partially shown. The motor shafts are not shown and the blowers are shown in dotted form.

DESCRIPTION OF THE PREFERRED EMBODIMENTS

Figure 5:
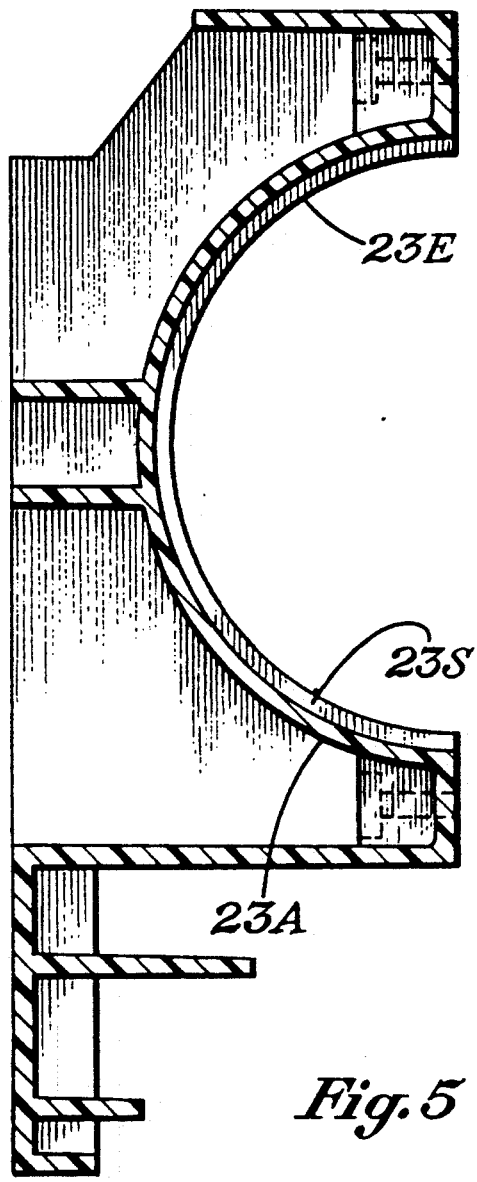
FIG. 5 is a cross-sectional view of the housing member of FIG. 3 taken along lines 5—5 thereof.
Figure 8:
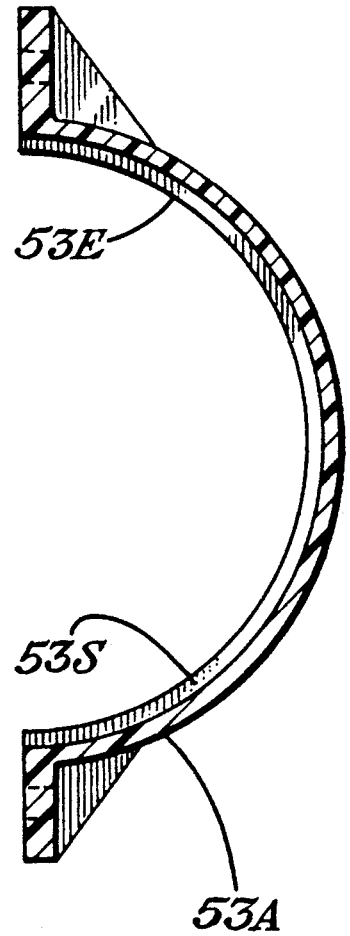
FIG. 8 is a cross-sectional view of the housing member of FIG. 6, taken along lines 8—8 thereof.

Referring to the drawings the blower housing is identified by reference numeral 21 and comprises a bottom housing member or scroll 23 and a top housing member or scroll 53. The bottom housing member 23 has a motor chamber portion 23MC located between two blower chamber portions 23BC1 and 23BC2 which are open from edges 23MCE and 23BC1E and 23BC2E and hence from side 25.

The motor chamber portion 23MC is a cavity in the form of a semi-circle in cross section. The blower chamber portions 23BC1 and 23BC2 are identical cavities each formed by end walls 31 and 33, side walls 35 and 37, and a bottom wall portion 39. Side walls 35 and 37 have semi-circle openings 35(0) and 37(0) formed therethrough. The bottom walls 39 do not extend completely across the bottom openings of the cavities 23BC1 and 23BC2 leaving small bottom openings 41. The bottom housing member 23 is a single member molded from plastic.

The top housing member 53 has a motor chamber portion 53MC located between two blower chamber portions 53BC1 and 53BC2 which are open from edges 53MCE and 53BC1E and 53BC2E and hence from side 55.

The motor chamber portion 53MC is a cavity in the form of a semi-circle in cross section. The blower chamber portions 53BC1 and 53BC2 are identical cavities each formed by a semi-circular wall 61 and side walls 65 and 67. Side walls 65 and 67 have semi-circle openings 65(0) and 67(0) formed therethrough. The top housing member 53 is a single member molded from plastic.

The edges 23MCE, 23MC1E and 23BC2E and 53MCE, 53BC1E and 53BC1E of the bottom and top members 23 and 53 can be fitted together respectively to form a motor chamber from motor chamber portions 23MC and 53MC; and two blower chambers from blower chamber portions 23BC1 and 53BC1 and blower chamber portions 23BC2 and 53BC2 respectively for receiving the cylindrical housing 71 of a motor 73 and conventional cylindrical squirrel cage blowers B1 and B2 connected to the shafts 75 of the motor 73.

The bottom and top housing members 23 and 53 are secured together by screws 83 which are inserted through guide holes 85 formed through member 53 and screwed into threaded holes 87 formed in member 23.

The motor housing 71 is secured and held in place in the motor chamber 23MC, 53MC by arcuate edges of the housing members 23 and 53 and by two gaskets 91 which are removably fitted in arcuate (semi-circle) slots or channels 23S and 53S formed in the central arcuate walls 23A and 53A of the members 23 and 53 defining the motor chamber portions 23MC and 53MC. The slots 23S and 53S each are formed between two arcuate (semi-circle) edges 23E and 53E of the walls 23A and 53A respectively of the members 23 and 53.

The gaskets 91 are rectangular in shape and have a thickness such that they extend radially inward of the edges 23E and 53E when fitted in the slots 23S and 53S such that they will engage and be compressed by the motor housing 71 when it is fitted in the motor chamber 23MC, 53MC and the edges of the members 23 and 53 are fitted and secured together by the screws 83. The gasket 91 in the preferred embodiment is an injection molded elastomer or thermoplastic rubber known as SANTOPRENE produced by Monsanto Chemical Company. It has a durometer of 55. Gaskets of various durometers can be used.

FIG. 9 illustrates the motor housing 71 secured in the motor chamber of the motor chamber when the edges of the two members 23 and 53 are fitted and secured together by the screws 83. In this position, the arcuate surfaces of the edges 23E and 53E engage and support the motor housing 71 parallel with the edges 23BC1E, 23MCE, 23BC2E and 53BC1E, 53MCE, 53BC1E whereby the blowers cannot hit the inside walls of the blower chambers. The gaskets 91 prevent the motor housing 71 from sliding and reduce vibration.

The housing members 23 and 53 may be formed such that each of the inside walls 23A and 53A of the slots 23S and 53S has a radius of from 1.6 to 1.8 inches and the inside surfaces of each of the edges 23E and 53S has a radius of from 1.5 to 1.7 inches respectively to form motor chambers of different sizes to receive and hold motor housings of different diameters with the use of the same size gaskets 91. These dimensions may be varied. The thickness of the gaskets should be approximately 50% greater than the depth of the slots 23S, 53S from the edges 23E and 53E respectively. The material and the thickness of the gaskets however, should allow the gaskets to be compressed sufficient to allow the edges 23E and 53E of the slots to engage the motor housing when assembled in place. In one embodiment the gasket 91 has a thickness of about ⅛ of an inch, a width of about 1⅞ of an inch and a length of about 4⅜ inches. Thus the housing 21 can be formed to accommodate A.C. or D.C. motors which vary in diameter and are produced by different companies.

The slots 23S and 53S in one embodiment each has a width of about 1 6/16 of an inch for tightly accepting the gaskets 91. The gaskets 91 have a length such that they will extend along substantially the entire inside circumferences of the slots 23S and 25S.

It is to be understood that each of the top and bottom housing members may be constructed to form two or more narrower side-by-side slots in their motor chamber portions, separated by an intermediate arcuate edge respectively for accepting two or more narrower gaskets 91. Thus each motor chamber portion will have two or more gaskets for engaging and facilitating in the holding of the motor housing.

The blowers B1 and B2 are identical and comprise spaced apart slots 101 or vanes connected to rims 103 and 105 and to an intermediate disk 107 located within the blowers. The disk 107 has a central aperture 109 formed therethrough for receiving a shaft 75 which is secured to the disk 107 by a clip 111. The blowers are formed of a suitable plastic.

Members F1 and F2 are annular plastic flanges which are snap fitted to the structure forming the side openings 35(0), 65(0) and 37(0), 67(0) of the blower chambers. When the motor is held by the gaskets 91, the shafts 75 extend through the opening of flanges F1 and F2 into the blower chambers 23BC1, 53BC1 and 23BC2, 53BC2 in which are located the blowers B1 and B2 for rotation. Upon rotation of the blowers B1 and B2, all is drawn through the openings of the flanges F1 and F2 and forced outward through openings 41 onto the evaporator coil (or free air) of a motor vehicle air conditioner for cooling, heating, or ventilation purposes, as well as other heating, cooling, and ventilating purposes in industrial, commercial or residential use.

The housing members 23 and 53, flanges F1 and F2 and blowers B1 and B2 may be formed of suitable thermoplastic materials such as ABS, or other flame retardant or high heat plastic materials as required. It is to be understood that the housing members 23 and 53 and their gaskets may have dimensions different from those mentioned above.

I claim:

1. A blower housing for spaced apart blowers to be driven by a motor located between the blowers, the blowers being coupled to shaft means of the motor on opposite ends thereof, comprising:

two housing members each having a motor chamber portion located between two blower chamber portions, said two housing members each having an open side leading to said motor and blower chamber portions respectively with edge means adapted to fit together to form a motor chamber for receiving and holding a motor and blower chambers for receiving blowers coupled to opposite ends of the motor by shafts means, said motor chamber portions each comprising an arcuate portion having at least one arcuate slot formed between two arcuate edges, a gasket adapted to be removably located in each of said arcuate slots of said motor chamber portions such that when said edge means of said two housing members are fitted together, the housing of the motor is engaged and held by said arcuate edges and by said gaskets when located in said arcuate slots of said motor chamber portions, 2. The blower housing of claim 1, wherein:

each of said gaskets are rectangular in shape and have a given thickness.

3. The blower housing of claim 2, wherein:

each of said gaskets has a thickness greater than the depth of said slots, each of said gaskets is formed of a compressible material whereby said gaskets are compressed by the housing of said motor when said edge means of said two housing members are fitted together with said motor located in said motor chamber such that said motor is engaged and held by said arcuate edges and by said gaskets.

4. The blower housing of claim 1, wherein:

the thickness of each of said gaskets is greater than the depth of said slots, each of said gaskets is formed of a compressible material whereby said gaskets are compressed by the housing of said motor when said edge means of said two housing members are fitted together with said motor located in said motor chamber such that said motor is engaged and held by said arcuate edges and by said gaskets.

5. A blower housing apparatus for spaced apart blowers to be drive by a motor located between the blowers, the blowers being coupled to shaft means of the motor on opposite ends thereof, comprising:

two spaced apart blowers coupled to opposite ends of a motor by shaft means such that said motor can rotate said blowers by way of said shaft means, two housing members each having a motor chamber portion located between two blower chamber portions, said two housing members each having an open side leading to said motor and blower chamber portions respectively with edge means adapted to fit together to form a motor chamber for receiving and holding said motor and blower chambers for receiving said blowers coupled to said shaft means of the motor extending from opposite ends thereof, said motor chamber portions each comprising an arcuate portion having at least one arcuate slot formed between two arcuate edges, a separate gasket removably located in each of said arcuate slots of said motor chamber portions, said edge means of said two housing members being fitted together with said motor being located in said motor chamber and the housing of said motor being engaged and held by said arcuate edges and by said gaskets and said two blowers being located in said blower chambers respectively.

6. The blower housing of claim 5, wherein:

each of said gaskets has a thickness greater than the depth of said slots, each of said gaskets is formed of a compressible material whereby said gaskets are compressed by the housing of said motor when said edge means of said two housing members are fitted together with said motor located in said motor chamber such that said motor is engaged and held by said arcuate edges and by said gaskets.

7. The blower housing of claim 5, wherein:

each of said gaskets are rectangular in shape and have a given thickness.

8. The blower housing of claim 7, wherein:

the thickness of each of said gaskets is greater than the depth of said slots, each of said gaskets is formed of a compressible material whereby said gaskets are compressed by the housing of said motor when said edge means of said two housing members are fitted together with said motor located in said motor chamber such that said motor is engaged and held by said arcuate edges and by said gaskets.

* * * * *